United States Patent
Dice

(10) Patent No.: US 9,424,013 B2
(45) Date of Patent: Aug. 23, 2016

(54) SYSTEM AND METHOD FOR REDUCING TRANSACTIONAL ABORT RATES USING COMPILER OPTIMIZATION TECHNIQUES

(75) Inventor: David Dice, Foxboro, MA (US)

(73) Assignee: Oracle America, Inc., Redwood City, CA (US)

(*) Notice: Subject to any disclaimer, the term of this patent is extended or adjusted under 35 U.S.C. 154(b) by 1996 days.

(21) Appl. No.: 12/345,189

(22) Filed: Dec. 29, 2008

(65) Prior Publication Data
US 2010/0169870 A1    Jul. 1, 2010

(51) Int. Cl.
*G06F 9/45* (2006.01)
*G06F 9/46* (2006.01)

(52) U.S. Cl.
CPC .............. *G06F 8/4441* (2013.01); *G06F 9/467* (2013.01)

(58) Field of Classification Search
None
See application file for complete search history.

(56) References Cited

U.S. PATENT DOCUMENTS

| | | | | |
|---|---|---|---|---|
| 5,826,089 A | * | 10/1998 | Ireton | 717/146 |
| 5,920,898 A | * | 7/1999 | Bolyn et al. | 711/167 |
| 6,092,156 A | * | 7/2000 | Schibinger et al. | 711/145 |
| 6,477,641 B2 | * | 11/2002 | Davis et al. | 712/241 |
| 7,350,034 B2 | * | 3/2008 | Shen | G06F 12/0833 |
| | | | | 711/145 |
| 2007/0169030 A1 | | 7/2007 | Tarditi et al. | |
| 2008/0098374 A1 | * | 4/2008 | Adl-tabatabai et al. | 717/145 |
| 2009/0132991 A1 | * | 5/2009 | Ganai et al. | 716/18 |
| 2015/0032924 A1 | * | 1/2015 | Saripalli | G06F 9/30087 |
| | | | | 710/106 |

OTHER PUBLICATIONS

Ravi Rajwar, "Speculative Lock Elision:: Enabling Highly Concurrent Multithreaded Execution", 2001, pp. 294-305 [online][retrieved on Apr. 29, 2013]. Retrieved from<http://dl.acm.org/citation.cfm?id=564036>.*

(Continued)

*Primary Examiner* — Evral E Bodden
(74) *Attorney, Agent, or Firm* — Robert C. Kowert; Meyertons, Hood, Kivlin, Kowert & Goetzel, P.C.

(57) ABSTRACT

In transactional memory systems, transactional aborts due to conflicts between concurrent threads may cause system performance degradation. A compiler may attempt to minimize runtime abort rates by performing code transformations and/or other optimizations on a transactional memory program in an attempt to minimize store-commit intervals. The compiler may employ store deferral, hoisting of long-latency operations from within a transaction body and/or store-commit interval, speculative hoisting of long-latency operations, and/or redundant store squashing optimizations. The compiler may perform optimizing transformations on source code and/or on any intermediate representation thereof (e.g., parse trees, un-optimized assembly code, etc.). The compiler may preemptively avoid naïve target code constructions. The compiler may perform static and/or dynamic analysis of a program in order to determine which, if any, transformations should be applied and/or may dynamically recompile code sections at runtime, based on execution analysis.

20 Claims, 9 Drawing Sheets

(56) References Cited

OTHER PUBLICATIONS

David Dice, et al., "Applications of the Adaptive Transactional Memory Test Platform," 2008, 10 pages.
Dice, et al., "Transactional Locking II," DISC 2006, 15 pages.
Lepak, et al, "Silent Stores for Free," 2000 IEEE, 10 pages.
Eddon, et al, "Language Support and Compiler Organizations for STM and Transactional Boosting," Springer Berlin/Heidelberg, 2007, pp. 209-224.
Adl-Tabatabai, et al., "Compiler and Runtime Support for Efficient Software Transactional Memory," Proceedings of the 2006 ACM SIGPLAN Conference on Programming Language Design and Implementation, 2006, pp. 26-37.
Wang, et al, "Code Generation and Optimization for Transactional Memory Constructs in an Unmanaged Language," Mar. 11-14, 2007, Programming Syst. Lab., Intel Corp., Appears in Code Generation and Optimization, 2007. CGO '07. International Symposium.

* cited by examiner

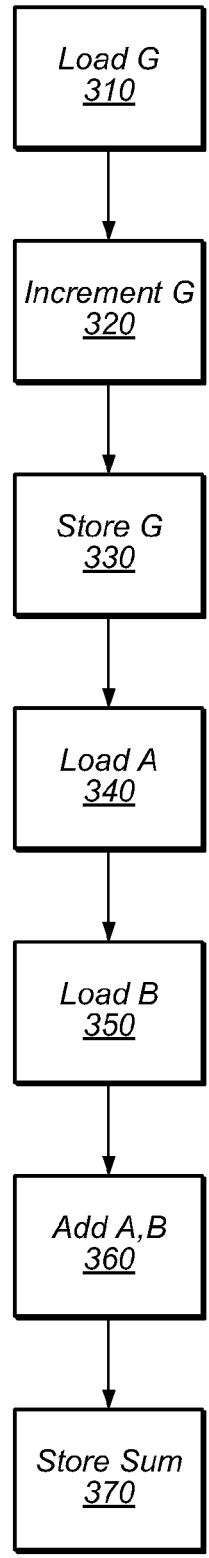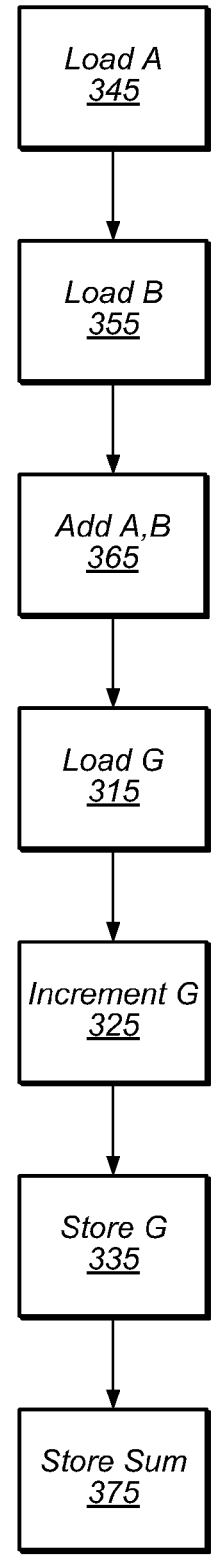
FIG. 3A
FIG. 3B

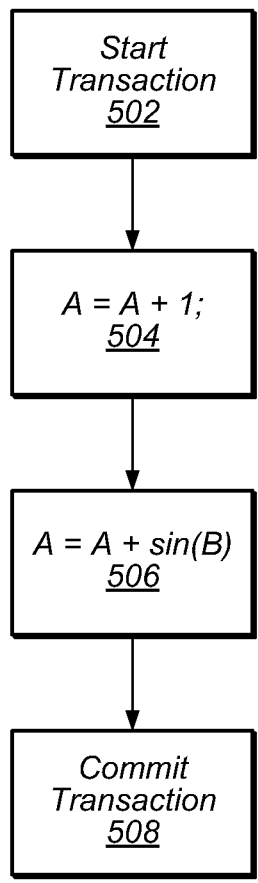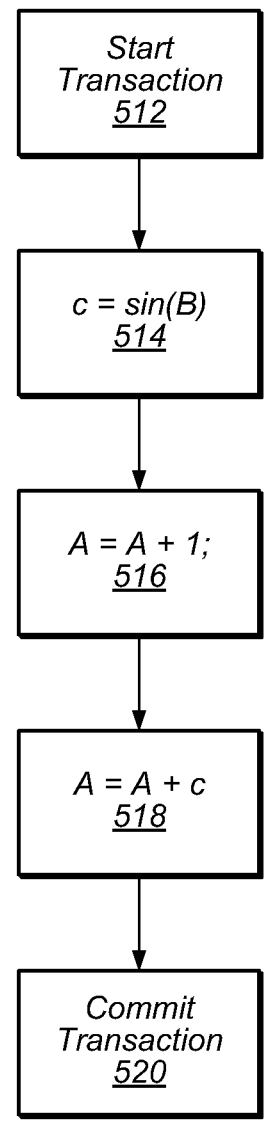
FIG. 5A
FIG. 5B

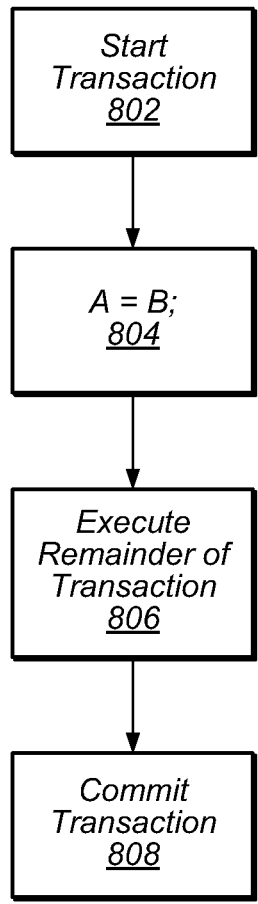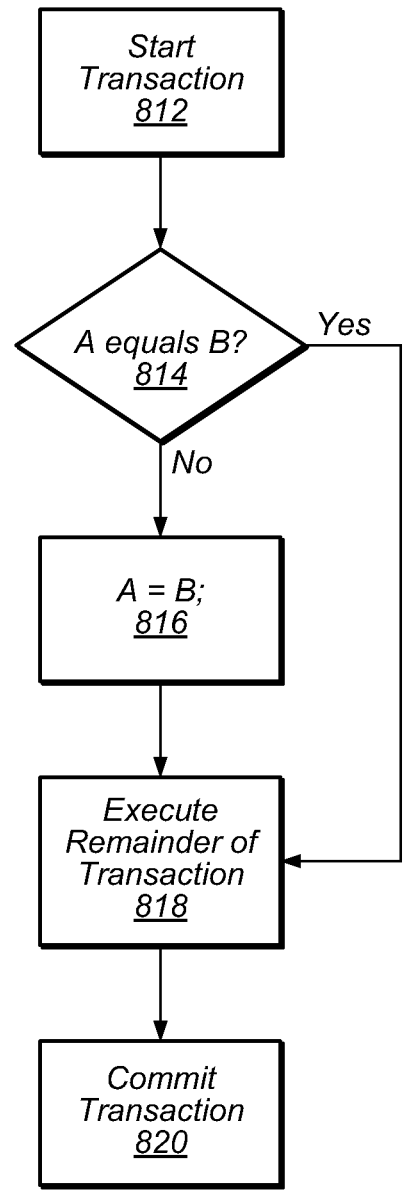
FIG. 8A
FIG. 8B

SYSTEM AND METHOD FOR REDUCING TRANSACTIONAL ABORT RATES USING COMPILER OPTIMIZATION TECHNIQUES

BACKGROUND OF THE INVENTION

1. Field of the Invention

This invention relates generally to transactional memory computer systems and, more specifically, to a system and method for reducing abort rates in transactional memory systems through compiler optimization of computer code.

2. Description of the Related Art

Shared-memory computer systems allow multiple threads of execution to access and operate on the same memory locations. In such systems, it is often important that a thread execute a series of instructions as a single atomic block. Any other thread that observes memory values resulting from a partial execution of an atomic block, may behave incorrectly.

Transactional memory is a mechanism that allows a thread to execute a series of instructions as a transaction, that is, either completely and atomically or not at all. The instructions comprising a transaction may be executed and then either "committed", allowing the aggregate effect to be seen by all other threads, or "aborted", allowing no effect to be seen. Transactional attempts that commit may be said to have "succeeded", while those that abort may be said to have "failed". If a transaction aborts, the thread may retry executing the transaction. Transactional memory may be implemented in hardware, software, or a combination thereof.

There are various reasons why a transactional attempt may abort. In some cases, a transactional attempt may fail because it is infeasible to execute the particular instruction sequence transactionally. For example, a given sequence of instructions may be too long to execute transactionally because it may require more transactional resources than are available on the hardware. In another example, it may be infeasible to execute a given instruction sequence transactionally because it contains one or more instructions that cannot be executed transactionally, such as one or more I/O instructions.

In some cases, a transactional attempt may abort or be aborted due to a conflict with another, concurrently executing, thread. For example, if during the execution of a given transaction, another thread modifies a memory location read by the transaction, the transaction may abort. Likewise, if a transaction modifies a shared memory location that is read by another thread before the transaction commits, then the transaction may abort. If the shared memory location were read by the other thread as part of a transaction, it is possible that both transactions would abort. This may be referred to as mutual abort. Repeated transactional aborts may lead to system performance degradation.

SUMMARY

In transactional memory systems, conflicts between concurrent threads may cause transactional aborts, which may lead to performance degradation. In various embodiments, a compiler may perform one or more code transformations and/or other compiler optimizations on a transactional memory program in order to reduce the program's transactional abort rate. According to some embodiments, the compiler may perform optimizing transformations on a source code representation and/or on any intermediate representation (e.g., a parse tree, un-optimized assembly code, etc.) of the given program in order to reduce the rate of aborts experienced by the application at runtime. In some embodiments, a compiler may preemptively avoid naïve output code constructions and may instead generate code optimized to reduce transactional aborts directly from a source or intermediate representation.

In some embodiments, the compiler may attempt to minimize abort rates by attempting to minimize one or more store-commit intervals in the execution of the program. A store-commit interval may refer to the runtime interval between when a thread performs a store operation inside of a transaction body and when the thread attempts to commit that transaction. During a store-commit interval, one or more threads may be at risk of aborting. In some embodiments, a compiler may attempt to minimize the length or number of occurrences of one or more store-commit intervals by performing one or more store deferral, hoisting, speculative hoisting, redundant store squashing, and/or data layout optimizations, as described herein.

Using a store deferral optimization, as described herein, a compiler may reduce the length of an access-commit interval (e.g., a store-commit interval) by performing a store operation as near to the end of a transaction body's execution as possible. In some embodiments, a compiler may perform a store deferral optimization by performing and/or consulting an analysis of data dependencies in the program.

Using a hoisting optimization, as described herein, a compiler may reduce the length of a store-commit interval by hoisting a long-latency calculation located within a store-commit interval to a location outside of the store-commit interval. In some embodiments, a compiler may perform this optimization by configuring the output program to execute the long-latency operation prior to the start of the store-commit interval, to store the result of the long-latency operation in memory, and to use the stored result inside the store-commit interval, rather than invoking the long-latency operation inside the store-commit interval. Using a speculative hoisting optimization, as described herein, a compiler may hoist a long-latency calculation within a store-commit interval of a transaction to a location outside of a store-commit interval by configuring the output program to perform the long-latency operation prior to the start of the transaction. The output program may be further configured to store the result of the long-latency operation in memory and to use the stored result in the transaction body rather than invoking the long-latency operation only if the parameters on which the result is dependant are unmodified since the long latency calculation was performed. In various embodiments, a speculative hoisting optimization may be used to relocate a transactionally infeasible instruction to a location outside of the transaction.

Using a redundant store squashing optimization, as described herein, a compiler may reduce the length of, or eliminate altogether, a store-commit interval by configuring the output program to perform a store operation only if execution of the store operation would cause at least one value in memory to change. That is, the output program may execute a given store operation only if the operation is attempting to store a value to a memory location that does not already contain that value. Thus, a compiler may obviate the execution of one or more store instructions within a transaction and the corresponding store-commit intervals.

Using a data layout optimization, as described herein, a compiler may eliminate a store-commit interval and/or reduce false-positive aborts. In some embodiments, a data layout optimization may include moving two variables that are commonly modified together in a transaction onto the same abort detection modules (e.g., cache blocks) in order to reduce abort rates. In some embodiments, a data layout optimization may include isolating frequently modified variables by allocating such variables onto abort detection modules separate from those containing memory locations allocated for other variables.

In some embodiments, a compiler may be configured to analyze a source program and/or one or more other representations of the program in order to determine which, if any, transformations the compiler should apply. This may be referred to as static analysis. In other embodiments, a runtime system with dynamic recompilation capabilities, such as a Java Virtual Machine™, may apply dynamic (i.e., runtime) analysis to the execution of a program. Such analysis may be used to determine whether one or more sections of the program should be recompiled using various optimizations, such as those as described herein, and if so, which optimizations should be used. For example, in embodiments that employ dynamic recompilation, a compiler may use adaptive runtime feedback regarding abort rates and, where possible, abort-specific information (e.g., the identity of the variables, cache blocks, or other entities involved) in its analysis. In some embodiments, each abort-reduction optimization technique described herein may be associated with one of various compiler optimization levels.

BRIEF DESCRIPTION OF THE DRAWINGS

FIGS. 3A-3B illustrate transformation of an instruction stream using a store deferral optimization, according to various embodiments.

FIGS. 5A-5B illustrate transformation of an instruction stream using a hoisting optimization, according to various embodiments.

FIGS. 8A-8B illustrate transformation of an instruction stream using a redundant store squashing optimization, according to various embodiments.

Figure 1:
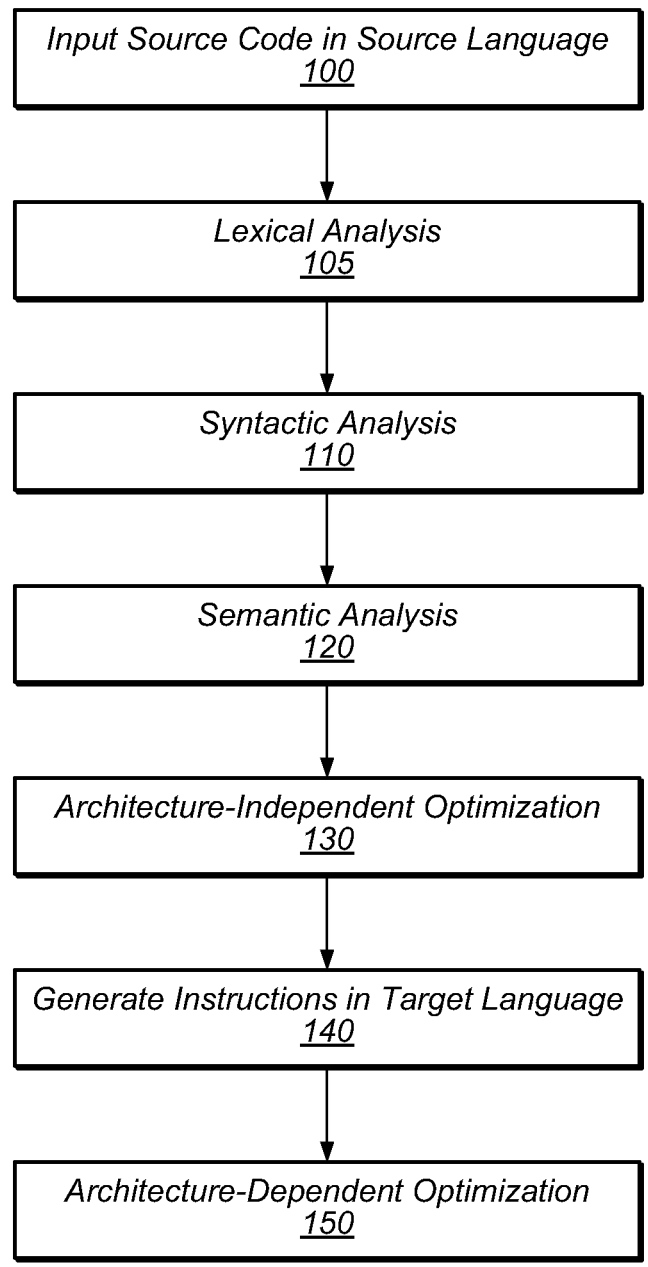
FIG. 1 is a flowchart illustrating the phases of compiling source code, according to various embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must).

Similarly, the words "include", "including", and "includes" mean including, but not limited to.

DETAILED DESCRIPTION OF THE EMBODIMENTS

In a transactional memory system, a transaction may modify one or more values in shared memory. Any program instruction whose execution causes a value of a shared memory location to change may be referred to herein as a store instruction. Execution of a store instruction may perform functions other than the modification of one or more memory values. For example, a compare-and-swap (CAS) operation may compare the value contained in a memory location to a given value and, if the two values are the same, modify the value of the memory location to a given new value. Because its execution may modify a value in a shared memory location, such an instruction may also be considered a store instruction.

When a thread executes a store instruction as part of a transaction, the transaction may conflict with one or more other concurrently executing threads. As a result of this conflict, one or more of the threads involved in the conflict may abort and/or be otherwise delayed. For example, if a second thread reads or modifies the value in the same memory location before the transaction has been committed, then the transaction may abort. Furthermore, if the second thread performed the read or store as part of a second transaction, then the second transaction may also abort.

Computer code, such as multi-threaded programs written for transactional memory systems, are often written by programmers in a high level language such as Java™ or C and then compiled, using a compiler program, into an architecture-specific lower level language, such as an assembly language, byte-code, or binary language. During compilation, the compiler may analyze the input code and attempt to produce efficient output code in the target language by performing certain transformations of intermediate code representations and/or preemptively avoiding naïve constructs within the output code. These optimizations should not alter the input program semantics. According to various embodiments, a compiler may perform one or more optimizations in an attempt to minimize the abort rate that one or more transactions will experience during program execution.

In some embodiments, a compiler may attempt to minimize runtime abort rates in output code execution by attempting to minimize the length of one or more store-commit intervals in the output code execution. A store-commit interval, as used herein, may refer to an interval of time between when a thread executes a store instruction inside of a transaction and when the thread attempts to commit that transaction. The store-commit interval may be "opened" by an execution of the store instruction inside a transaction and "closed" once the transaction is committed (or aborted). A transaction may have any number of store-commit intervals open concurrently, each corresponding to a unique store operation. In various embodiments, a program compiler may attempt to minimize the length and/or occurrence of store-commit intervals in a compiled program and thereby decrease the probability of the program experiencing one or more transactional aborts at runtime.

It should be noted that the length of a store-commit interval may be a function of a dynamic execution path of a program. Therefore, the store-commit interval associated with the execution of a given store instruction may not be the same length for different execution instances. For example, a store operation may be followed by a conditional operation that controls access to various execution paths with arbitrarily different runtimes. Thus, each execution instance of a given transaction may cause different store-commit intervals to be associated with the same store instruction. Therefore, in various embodiments, a compiler may perform optimizations in an attempt to minimize the length of at least one possible store-commit interval of a given store instruction.

FIG. 1 is a flowchart illustrating a method for compiling source code, according to various embodiments. In this example, a compiler may accept, as input, a source code representation of a software program or component in a high level source language such as Java™ or C, as in 100. As shown in 105, the compiler may then break the source code into meaningful units in a lexical analysis, or scanning, phase. The compiler may then parse the tokens in a syntactic analysis phase (as in 110) and build one or more syntactic structures (e.g., a parse tree and/or abstract syntax tree), which may serve as intermediate code representations. The compiler may add semantic information to the syntactic structures through a semantic analysis phase, as in 120.

In some embodiments, the compiler and/or another component (e.g., optimizer) may optimize intermediate code representations using architecture-independent optimizations, as in 130. During architecture-independent optimization phase 130, the compiler may perform transformations aimed at minimizing the length of and/or reducing the number of store-commit intervals of various store operations. In various embodiments, the compiler may perform transformations that may increase the feasibility of performing architecture-dependent optimizations, or the effectiveness of such optimizations. In this example, such architecture-dependent optimizations may be performed at a later phase (e.g., 150).

In the example illustrated in FIG. 1, the compiler may generate architecture-specific instructions for the target architecture, as in 140. The architecture-specific instructions may include a series of machine executable instructions coded as assembly language, microinstructions, byte-code, binary, or any other machine executable instruction language. The code may be executable by a physical or virtual machine implementation of the target architecture, in different embodiments.

In various embodiments, the compiler may perform any number of architecture-dependent optimizations on the architecture-specific instructions during an architecture-dependent optimization phase, such as phase 150. Phase 150 may include various optimizations that may reduce abort rates experienced by one or more transactions during execution of the program. For example, the compiler may attempt to minimize the length of one or more store-commit intervals during execution of the generated code.

In the example illustrated in FIG. 1, various abort rate reduction techniques may be included in phase 130 and/or in phase 150. In other embodiments, techniques for reducing one or more store-commit intervals may be implemented in any other phase of compilation, including phases not pictured in FIG. 1. In other embodiments, phase 130 and/or 150 may be integrated into other phases and either or both may be omitted. In various embodiments, additional phases may be added (e.g., a pre-processing phase). In some embodiments, the compiler may execute before runtime, while compilers in other embodiments may execute at runtime (e.g., Just-In-Time compilation). In various embodiments, one or more optimization techniques may be associated with one or more compiler optimization levels. For example, a compiler may perform a given optimization only if the compiler executes at optimization level 2 or higher.

In some embodiments, in response to various runtime conditions (e.g., frequent aborts of one or more transactions) a compiler may dynamically re-compile a code section corresponding to a transaction. To reduce the abort rate of the affected code section(s), such dynamic recompilation may be performed using various levels of optimization and/or various combinations of optimizations. In some embodiments, the runtime system may be configured to determine if a section should be recompiled and/or which optimizations should be used. In some embodiments, the decision to dynamically recompile a section with a given set of optimizations enabled may be determined using runtime information such as transactional abort rates, transactional abort relationships, the level of concurrency and/or traffic over a given shared memory location, and/or any other runtime data.

In various embodiments, the compiler may generate an instruction sequence and then perform code transformations on the sequence to achieve an optimized instruction sequence (e.g., one with shorter store-commit intervals than the original sequence). In other embodiments, the compiler may pre-emptively avoid naïve implementations and instead produce code that is optimized to minimize abort rates directly from intermediate representations rather than from an un-optimized instruction sequence.

According to various embodiments, a compiler may re-order, delete, and/or introduce one or more instructions to achieve a lower abort rate and/or a shorter store-commit interval at runtime. Such transformations may not alter the semantics of the program. For example, a compiler may compile code so that store instructions inside of transactions are executed as late as possible. This may be known as store deferral. By deferring a store operation, a compiler may minimize the length of a store-commit interval associated with that store operation.

Figure 2:
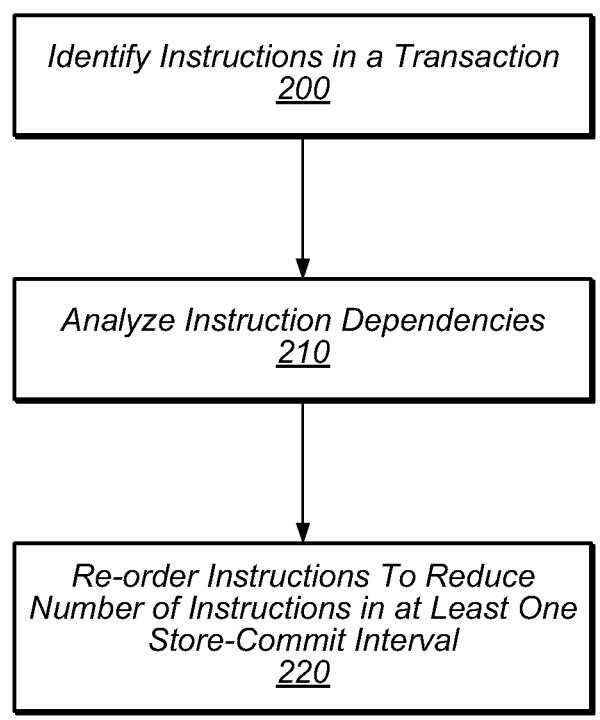
FIG. 2 is a flowchart illustrating a method for performing a store deferral optimization, according to various embodiments.

FIG. 2 illustrates a method for performing a store deferral optimization according to some embodiments. The compiler may perform the illustrated method as a code transformation on compiled code. In other embodiments, the compiler may defer stores by manipulating other intermediate representations, such as a parse tree. In this example, the compiler begins by identifying instructions that comprise a transaction, as in 200. The compiler may then analyze the dependencies between these instructions, as in 210. During analysis phase 210, the compiler may identify various types of data dependency hazards, such as Read-After-Write (RAW) hazards. Given these dependencies, the compiler may then rearrange the instructions comprising the transaction, in order to reduce the number of instructions in at least one store commit interval, as in 220.

Store deferral optimizations may be further illustrating in the following example. Consider the following pseudo-code:

```
1: begin transaction
2: G++;
3: Sum=A+B;
4: commit transaction
```

In this example, G, Sum, A, and B may be global variables in shared memory. FIGS. 3A and 3B illustrate a store deferral optimization associated with compilation of this code. FIGS. 3A and 3B illustrate two possible instruction sequences (300 and 305) for performing the logic in the body of the above transaction (lines 2, 3). Instruction sequence 300, which may be produced by a naïve or traditional compiler, begins by loading the value of G into a register (via instruction 310), incrementing that value (via instruction 320), and storing the result in the shared memory location corresponding to variable G (via instruction 330). Executing this sequence of three instructions may achieve the purpose of incrementing G as described in line 2 of the pseudo-code. Since instruction 330 may be a store instruction inside of a transaction, the execution of 330 may open a store-commit interval. According to instruction sequence 300, four more instructions, corresponding to line 3 of the pseudo-code, must be executed before the transaction may commit. These are instructions 340 (load A), 350 (load B), 360 (sum A and B), and 370 (store the summation into the memory location of Sum). According to instruction sequence 300, after those instructions have been executed, then the transaction body has been executed and the transaction may commit, as in line 4. Therefore, according to instruction sequence 300, the store-commit interval of instruction 330 must remain open at least until instructions 340, 350, 360, and 370 are executed.

As illustrated in FIG. 3B, according to various embodiments, the body of the transaction (pseudo-code lines 2, 3) may instead be implemented using instruction sequence 305. In some embodiments, a compiler may produce (or accept as input) instruction sequence 300 and convert it to instruction sequence 305. In other embodiments, a compiler may produce instruction sequence 305 directly from source code and/or intermediate program representations.

In some embodiments, a compiler may recognize that the calculation of Sum=A+B in line 3 does not depend on the incrementing of G in line 2. Therefore, the store of G may be deferred until the end of the transaction body. This technique may be referred to herein as store deferral. In such embodiments, a compiler may attempt to place store instructions as near to the end of a transaction as possible. For example, the compiler may produce instruction sequence 305 rather than sequence 300. In instruction sequence 305, A and B are loaded into registers via load instructions 345 and 355 respectively, and the summation is calculated via instruction 365. The value of G is then loaded into a register (via instruction 315) and is incremented (via instruction 325). Finally, store instructions 335 and 375 may be executed.

In instruction sequence 300, the store-commit interval, opened by instruction 330, must remain open at least until four instructions (340, 350, 360, and 370) are executed. By contrast, in instruction sequence 305, the store-commit interval opened by the analogous store instruction 335 must remain open only until one other instruction (375) is executed. Therefore, though instruction sequence 305 produces the same programmatic result as instruction sequence 300, sequence 305 may be less likely to abort during an open store-commit interval than sequence 300.

In some embodiments, stores within a transaction may be deferred by being deflected to a software-based thread-local deferred store structure. For example, a software store-buffer may be maintained through the use of special non-transactional store instructions. Thus, the stores may be deferred until immediately before the commit of the transaction containing them. In such embodiments, an additional optimization may be implemented wherein multiple redundant stores may be collapsed. For example, it may only be necessary to perform the final store in a series of stores to the same memory location. In such embodiments, loads that cannot be proven by the compiler to not cause conflicts may be loaded from the deferred store structure to avoid read-after-write execution hazards. In some embodiments, the compiler may be configured to determine statically whether a given store instruction operates on an address that is subsequently read and, if not, the compiler may defer the store instruction within the transaction. Such code transformations may lead to reduced conflict abort rates and/or faster performance for transactions that experience conflicts.

In various embodiments, the compiler may attempt to minimize one or more store-commit intervals by performing optimizations other than simple instruction re-arrangement. In some embodiments, the compiler may be configured to move, or hoist, long-latency operations to points outside of a store-commit interval. For example, the compiler may move such operations to a point earlier in a transaction body, or to a point before a transaction body. Performing a hoisting optimization may in some embodiments include the compiler inserting logic into the compiled application that may not have been introduced otherwise.

Figure 4:
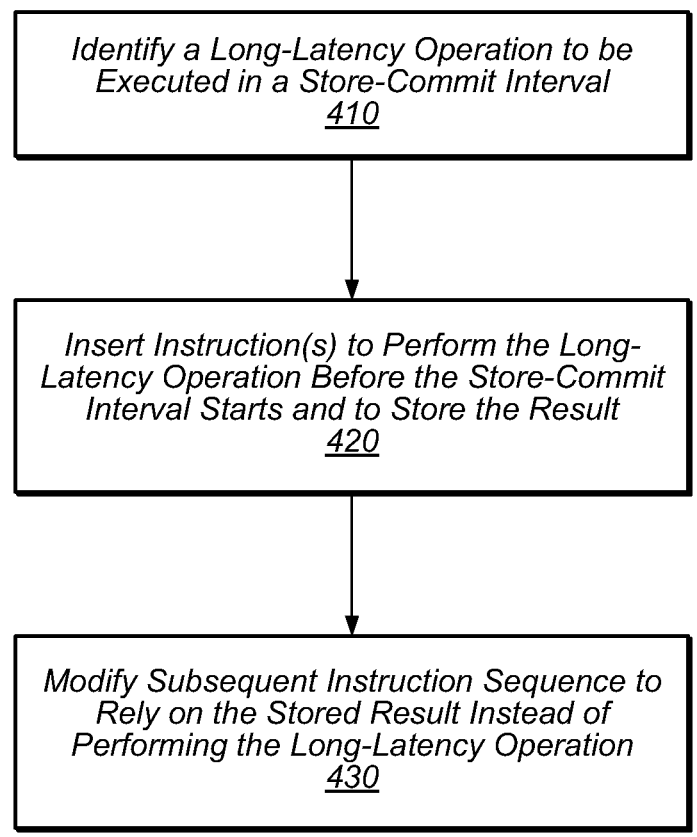
FIG. 4 is a flowchart illustrating a method for performing a hoisting optimization, according to various embodiments.

FIG. 4 illustrates an example of a method by which a compiler may hoist long-latency operations out of a store-commit interval. As before, the compiler may in some embodiments perform the illustrated method as a code transformation on compiled code. In other embodiments, the compiler may produce the effect of hoisting by manipulating other intermediate representations, such as a parse tree. In the example illustrated in FIG. 4, the compiler may first identify a long-latency operation in a store commit interval of a transaction body, as in 410. The compiler may then insert instructions to perform the long-latency operation outside of a store-commit interval and to store the result in memory, as in 420. For example, in some embodiments the result may be stored in a local variable in memory. In this example, as shown in 430, the compiler may modify the subsequent instruction sequence to rely on the result of the long-latency operation instead of performing it at its original point.

FIGS. 5A-5B illustrate an example of a hoisting transformation that may be performed by a compiler, according to various embodiments. FIG. 5A illustrates the execution sequence of an example transaction, prior to such transformation. Execution of 500 begins by starting a transaction, as in 502. In the transaction body, a given variable, A, is incremented by one, as in 504, and then incremented again by an amount equal to sin(B), as in 506. Finally, the transaction is committed as in 508. In this example, A and B may be variables in shared memory. Step 504 may necessitate a store operation to be executed and may therefore open a store-commit interval. The interval may be closed only after the instructions constituting steps 506 and 508 have been completed. On some systems, a sin( ) operation may be relatively time-consuming. Consequently, a store-commit interval opened in step 504 may be relatively long.

In various embodiments, a compiler may reduce a store-commit interval by moving, or hoisting, a long-latency operation, such as the sin( ) operation in execution sequence 500, out of a store-commit interval. In some embodiments, a long-latency operation may by hoisted to an earlier point in the transaction or to a point outside of the transaction altogether. The result of a hoisted operation may be stored in a local variable, shared memory location, and/or register. Instructions that invoke the long-latency operation may instead access the result directly. Thus, a hoisting technique may require new instructions to be introduced.

The sequence illustrated in FIG. 5B may be executed to achieve the same result as that illustrated in FIG. 5A, but with a shorter store-commit interval. In some embodiments, a compiler may produce execution sequence 510 by applying the hoisting technique, as described herein, to an execution sequence such as 500. Using this technique, the long-latency operation sin(B), in 506, may be hoisted out of the transaction body, as shown in execution sequence 510. In the example illustrated in FIG. 5B, a transaction is started (as in 512), and sin(B) is computed and stored in a new local variable c (as in 514). In some embodiments, the compiler may introduce the new variable as part of the compilation.

Although the store to c in step 514 may introduce a new store-commit interval, the interval may not be prone to causing an abort of the transaction because c, as a variable with local scope, cannot be read or modified by a remote thread. In this example, the compiler may output instructions to store the result of the sin(B) operation in a local register, thereby obviating the need for a store instruction to be executed and a corresponding store-commit interval to be opened between 514 and 520. In other embodiments, c may represent a globally accessible variable. In such embodiments, the compiler may still perform the transformation if a determination is made that such a transformation may be advantageous. In various embodiments, determinations such as whether to perform a hoisting transformation and/or where to store the result of the hoisted operation may be made statically (i.e., before runtime) by the compiler and/or during runtime by a runtime environment or a similar component.

In the example illustrated in FIG. 5B, following the execution of the added store instruction, A is incremented by one, as in 516. In step 518, A is incremented by c, that is, by the result of the long-latency sin(B) operation, as calculated in 514. Because step 518 does not include the long-latency sin(B) calculation itself, the store-commit interval opened at 516 and closed at 520 may be shorter than that opened by 504 and closed by 508. Thus, instructions executing sequence 510 may be less likely to abort than instructions executing sequence 500.

Figure 6:
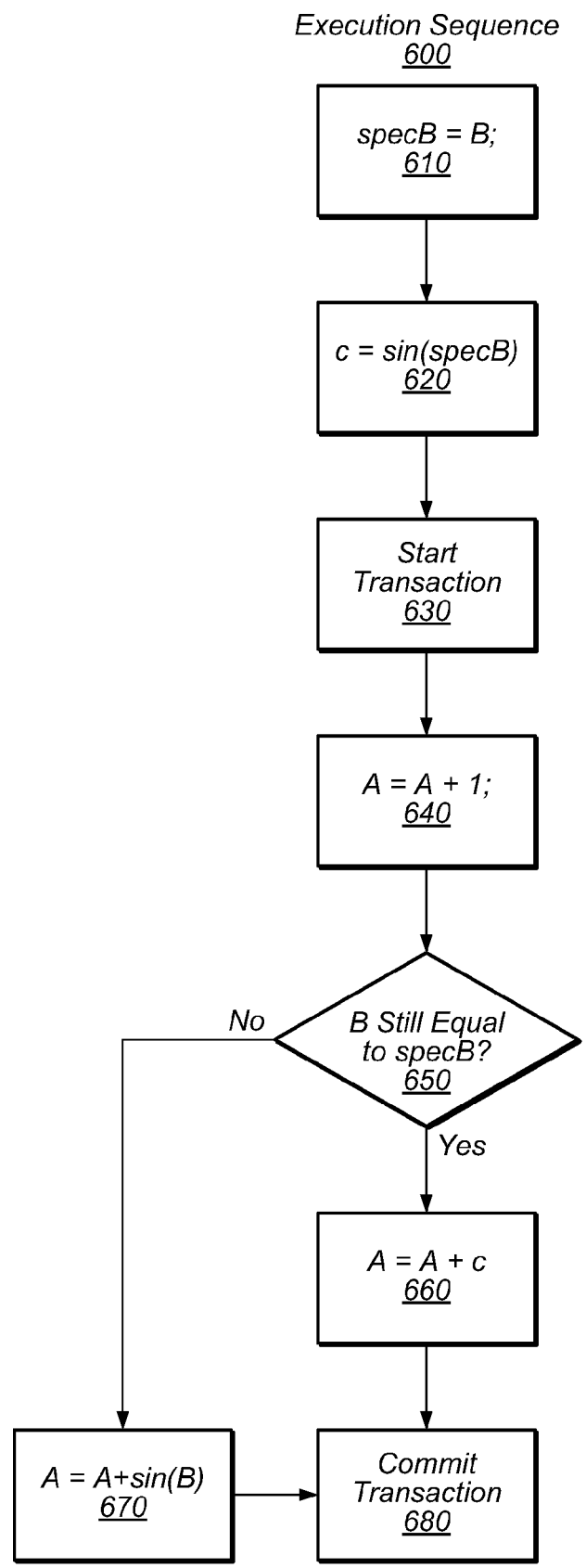
FIG. 6 illustrates an example of an instruction stream following a hoisting optimization, according to various embodiments.

In some embodiments, a compiler may move a long-latency operation, such as the sin( ) function, out of the transaction body altogether. This may be referred to as speculative hoisting. For example, rather than generating execution sequence 500, a compiler may produce program instructions to execute sequence 600, shown in FIG. 6. FIG. 6 illustrates an execution sequence in which a long-latency operation has been hoisted out of a transaction body, according to various embodiments. In FIG. 6, the sin( ) operation included in step 506 of FIG. 5A has been moved outside of the transaction body, which begins at 630. In this example, the value of B is recorded in a local variable (specB), as in 610. The sin( ) calculation is then performed using the speculative value of B and stored in a local memory location c, as in 620. According to execution sequence 600, the transaction may then be started (as in 630) and A incremented (as in 640). If the value of B is still equal to specB (the affirmative exit from 650), then c holds the proper value of sin(B) and may be used to increment A (as in 660). Otherwise, execution proceeds along the negative exit from 650, and sin(B) may be recalculated (as in 670), and the transaction may be committed (as in 680).

According to the optimization illustrated in FIG. 6, sin(B) may be speculatively executed outside of a transaction in order to avoid performing the long-latency sin( ) operation within a store-commit interval. While such a transformation is not guaranteed to shorten all store-commit intervals resulting from the execution of the transaction, it may shorten some. For example, executions that proceed along the negative exit from 650 may yield store-commit intervals that are not shorter than those of a naïve compilation. However, by hoisting the long-latency operation out of the transaction body, the store-commit interval of at least one execution path (the one proceeding through the affirmative exit from 650) may be shorter than the store-commit interval of execution sequence 500.

Speculative hoisting may in various embodiments be used for shortening the runtime of critical sections that use conventional mutual exclusion, of critical sections expressed via locks by converted transactions, and of explicit transactions. For example, the logic represented by the pseudo-code:

```
synchronized (lock){
    A = sin(A);
}
may be converted to:
    SpecA = A;
    SinA = sin(SpecA);
    Synchronized (lock) {
        if(A == SpecA)
            A = sinA;
        else
            A = sin(A);
    }
```

In this example, the compiler performs a transformation similar to that illustrated in FIG. 6, by hoisting a long-latency sin( ) operation out of a transaction body. In some embodiments, one or more instructions may be hoisted out of a transaction if those instructions cannot be executed transactionally. In such embodiments, the transaction may be used simply to ratify the result. As described herein, hoisting may be used to shorten critical sections and/or to relocate transactionally infeasible operations.

In some embodiments, a compiler may shorten a store-commit interval by creating execution paths through a transaction that avoid executing the initiating store instruction. For example, a store operation may be configured to store a value into a memory location that already holds that value. Such a store operation may be considered redundant and may open unnecessary store-commit intervals. In various embodiments, a compiler may squash such a redundant store operation by placing the corresponding store instruction inside of a conditional structure such that the store instruction is only executed if it is not redundant.

Figure 7:
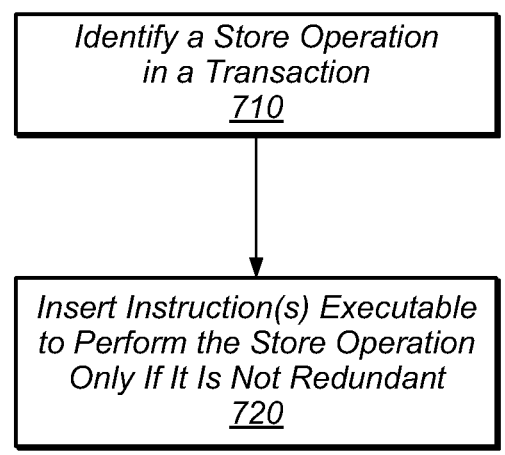
FIG. 7 is a flowchart illustrating a method for performing a redundant store squashing optimization, according to various embodiments.

FIG. 7 illustrates a method by which a compiler may squash store instructions, according to various embodiments. As before, the compiler may perform the illustrated method as a code transformation on compiled code. In other embodiments, the compiler may produce the effect of squashing store instructions by manipulating other intermediate representations, such as a parse tree. In the example illustrated in FIG. 7, the compiler may identify a store operation in a transaction, as in 710. The compiler may then insert one or more instructions into the compiled code that cause the store instruction to be executed only if it is not redundant, as in 720.

FIGS. 8A-8B illustrate an example of a transformation that may result in squashing a redundant store at runtime, according to various embodiments. FIG. 8A illustrates an execution sequence 800 for a transaction in a transactional memory system. In this example, a transaction is started (as in 802), a store operation is executed wherein the value of variable B is assigned to variable A (as in 804), the remainder of the transaction is executed (as in 806), and the transaction is committed (as in 808). In this example, the store operation 804 may open a store-commit interval. However, in some execution instances, the value of A and B may already be identical before step 804 is executed. In such executions, the store operation executed in step 804 would be redundant. In various embodiments, a compiler may squash such a redundant store by making the execution of the store instruction (e.g., 804) conditional on the value of the store target (e.g., A) and the store source (e.g., B) being different.

In some embodiments, a compiler may output program instructions corresponding to execution sequence 810, illustrated in FIG. 8B, to achieve the same programmatic result that illustrated in FIG. 8A. In execution sequence 810, a transaction is started (as in 812) and a store operation (as in 816) is executed only if it is determined that it is not redundant (shown as the negative exit from 814). In this example, the insertion of the determination step at 814 (e.g., which may be implemented using a compare type instruction) may cause fewer store-commit intervals, such as that between 804 and 808, to be opened at runtime. For example, during an execution instance of instruction sequence 810, if the store shown at 816 is determined to be redundant (shown as the affirmative exit from 814), then the store operation is not executed and no store-commit interval is opened. In either case, execution of the remainder of the transaction may continue (as in 818) and the transaction may be committed (as in 820). Thus, in execution instances in which the store operation of 816 would be redundant, the execution sequence illustrated in FIG. 8B avoids opening a store-commit interval, effectively shortening the interval to length zero.

In some embodiments, a compiler may reduce or eliminate one or more store-commit interval by performing a data layout optimization. A data layout optimization may include allocating memory for two or more program variables onto fewer or more abort detection modules (e.g., cache blocks) in order to reduce abort rates. For example, if a transaction tends to modify two given variables, then according to some embodiments, a compiler may allocate memory for the two variables such that the allocated memory is in the same cache block. Thus, the store-commit interval opened by the second variable store may be effectively subsumed by the store-commit interval opened by the first variable store. This is because the second interval may occur entirely within the first interval in time, and an abort during either interval would be contingent on the same conflict condition (e.g., another thread modifying the cache block).

In some embodiments, a compiler may perform a data layout optimization for decreasing transactional abort rates by allocating memory for variables that may be frequently modified (and/or that are frequently modified closely together in time) such that the variables are stored in abort detection modules separate from those where other variables and/or data structures are stored (e.g. those that are read, but infrequently written). Thus, a compiler may in some embodiments reduce the rate of "false-positive" aborts, e.g., those aborts that could occur when concurrent transactions access different variables that are stored within a same cache block, but that do not actually cause a logical conflict. In various embodiments, a compiler may detect opportunities for and/or perform data layout optimizations statically before runtime and/or dynamically during runtime.

The concept of a store-commit interval, as described herein, may be generalized to an access-commit interval, wherein an access may be either a load or a store operation. For example, a transaction may be vulnerable to abort due to conflicts between a read operation of the transaction and a write operation of another transaction, between a write operation of the transaction and a read operation of another transaction, or between a write operation of the transaction and a write operation of another transaction. The optimizations described herein may be employed to minimize an access-commit interval to reduce aborts due to any of these read-write, write-read, or write-write type conflicts. In general, the disclosed optimizations attempt to accomplish two goals: one is to minimize windows of vulnerability, that is, make a transaction less likely to be victimized by conflicting operations. The other is to make transactions more polite, that is, less likely to victimize other transactions. For example, redundant store squashing addresses both goals.

Store deferral, hoisting, store squashing, and/or data layout optimizations as described herein may be applied during any one or more of the compilation phases illustrated in FIG. 1. For example, during architecture-independent optimization phase 130, a compiler may ensure that the code produced by code generation phase 140 defers stores in a non-naïve manner (e.g., as illustrated in FIG. 3B). During architecture-dependent optimization phase 150, the compiler may be configured to determine whether sufficient hardware resources are available for executing optimized code. For example, since optimized instruction sequence 305 may require more registers than instruction sequence 300, the compiler may be configured to determine whether a sufficient number of registers exist to execute the optimized sequence. In various embodiments, the compiler may modify the instruction sequence in light of the hardware resources available.

Figure 9:
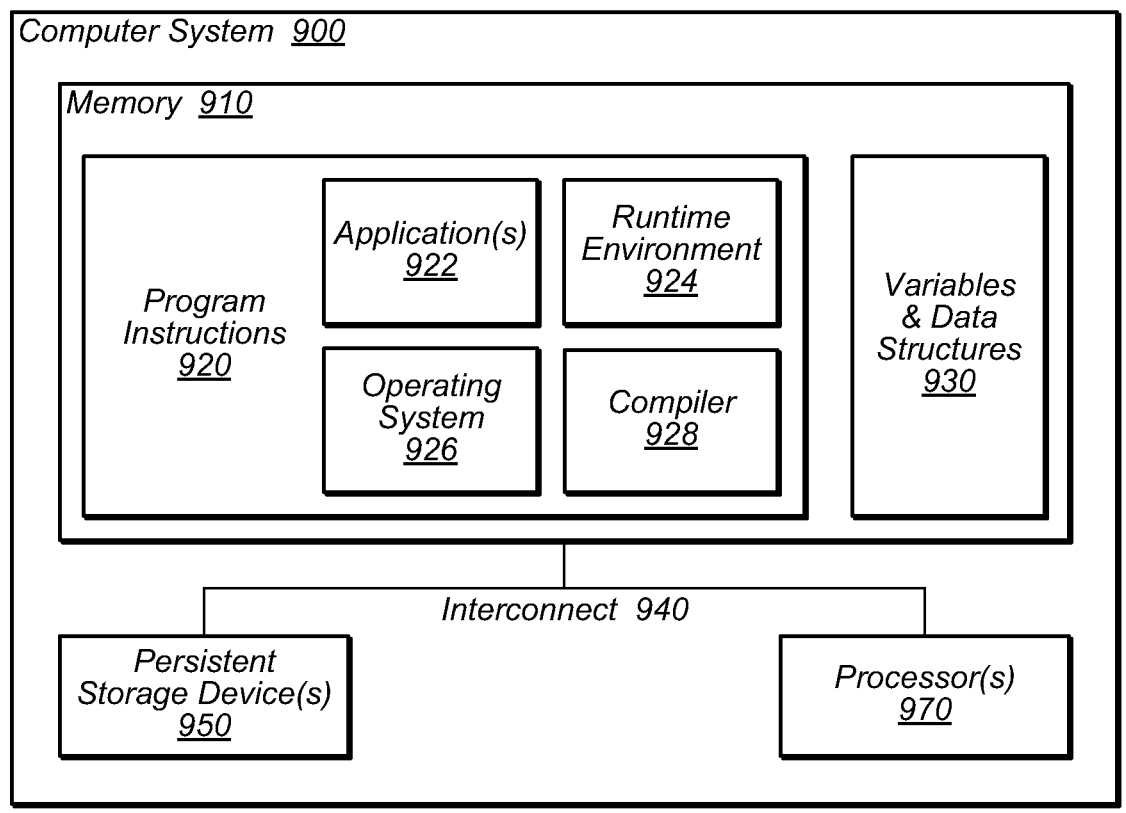
FIG. 9 is a block diagram illustrating a computer system configured to implement compiler optimizations for reducing transactional abort rates, according to various embodiments.

FIG. 9 illustrates a computing system configured to implement the methods described herein, according to various embodiments. The computer system 900 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The compiling mechanisms described herein may be provided as a computer program product, or software, that may include a computer-readable storage medium having stored thereon instructions, which may be used to program a computer system (or other electronic devices) to perform a process according to various embodiments described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 900 may include one or more processors 970, each may include multiple cores, any of which may be single or multi-threaded. One or more of processors 970 may be a logical processor (e.g., under symmetric multi-threading). The computer system 900 may also include one or more persistent storage devices 950 (e.g., optical storage, magnetic storage, hard drive, tape drive, solid state memory, etc) and one or more memories 910 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 9 (e.g., video cards, audio cards, additional network interfaces, peripheral devices, a network interface such as an ATM interface, an Ethernet interface, a Frame Relay interface, etc.).

The system components, including the one or more processors 970, memories 910, and persistent storage devices 950 may be connected via one or more interconnects 940. Interconnect 940 may be implemented as any broadcast, point-to-point, or hybrid communication mechanism such as a front side bus, Ethernet, InfiniBand™, etc.

One or more of the system memories 910 may contain program instructions 920. Program instructions 920 may be executable to implement one or more applications 922 and compilers 928 as described herein. Program instructions 920 may also include one or more operating systems 926 and/or runtime environments 924. Program instructions 920 may be encoded in platform native binary, any interpreted language such as Java™ byte-code, or in any other language such as C/C++, Java™, etc or in any combination thereof.

The application instructions 922 may include application source code 922 for compilation by a compiler 928 according to various embodiments described herein. A compiler 928 may perform any of the code transformations and optimizations (e.g., store deferral, hoisting, squashing) described herein for minimizing transactional abort rates and/or the length of one or more store-commit intervals in the execution of application(s) 922. Runtime environment 924 may provide runtime support for multithreading, transactional memory, and/or support for virtual machines such as the Java Virtual Machine™. Runtime environment 924 may also include support for dynamic recompilation of source code at runtime as described herein.

The system memory 910 may further comprise shared memory locations 930 for storing variables and data structures. For example, local variables may be used to store the results of long-latency operations (e.g., variable "c" in FIG. 5B). Global variables such as G, Sum, A, and B in FIG. 2 may also exist in shared memory locations 930. Compilers 924, applications 922, and/or any other programs defined by program instructions 920, may allocate and/or operate on variables and data structures contained in shared memory 930.

Although the embodiments above have been described in considerable detail, numerous variations and modifications will become apparent to those skilled in the art once the above disclosure is fully appreciated. For example, in some embodiments, the techniques described herein may be applicable to reducing access-commit intervals other than store-commit intervals. In various embodiments, the techniques may also be applicable to Transactional Lock Elision. It is intended that the following claims be interpreted to embrace all such variations and modifications.

What is claimed:

1. A computer-implemented method, comprising:
preparing, by a computer, an executable sequence of instructions corresponding to a source representation of code comprising an atomic transaction;
wherein said preparing comprises:
reducing a runtime interval of at least one execution path of the executable sequence between execution of a store instruction of the atomic transaction and an attempt to commit the atomic transaction, wherein the store instruction is an instruction whose execution stores a value into a shared memory location.

2. The method of claim 1, wherein said reducing comprises configuring the executable sequence to:
execute the store instruction only if the memory location does not already contain the value; and
not execute the store instruction if the memory location already contains the value.

3. The method of claim 1, wherein said reducing comprises reducing the number of instructions comprising a dynamic execution path of the executable sequence between the store instruction and the attempt to commit the atomic transaction.

4. The method of claim 1, wherein said reducing comprises reducing a cumulative runtime of instructions comprising a dynamic execution path of the executable sequence between the store instruction and the attempt to commit the atomic transaction.

5. The method of claim 1, further comprising:
performing a static analysis of the source representation;
wherein said reducing is dependent on the static analysis.

6. The method of claim 1, further comprising:
performing dynamic analysis of the executable sequence of instructions;
wherein said reducing is dependent on the dynamic analysis.

7. The method of claim 1, further comprising:
performing dynamic analysis of the executable sequence of instructions;
wherein said preparing is performed in response to the dynamic analysis.

8. The method of claim 1, wherein said preparing further comprises:
attempting to minimize the number of infeasible transactions included in the executable sequence of instructions, wherein an infeasible transaction is a transaction that comprises at least one instruction that cannot be executed transactionally.

9. A non-transitory computer-readable storage medium storing program instructions executable by a processor in a multi-processor system to implement:
preparing an executable sequence of instructions corresponding to a source representation of code comprising an atomic transaction;
wherein said preparing comprises:
reducing a runtime interval of at least one execution path of the executable sequence between execution of a store instruction of the atomic transaction and an attempt to commit the atomic transaction, wherein the store instruction is an instruction whose execution stores a value into a shared memory location.

10. The storage medium of claim 9, wherein said attempting comprises configuring the executable sequence to:
execute the store instruction only if the memory location does not already contain the value; and
not execute the store instruction if the memory location already contains the value.

11. The storage medium of claim 9, wherein said attempting comprises attempting to minimize the number of instructions comprising a dynamic execution path of the executable sequence between the store instruction and the attempt to commit the atomic transaction.

12. The storage medium of claim 9, wherein said reducing comprises reducing a cumulative runtime of instructions comprising a dynamic execution path of the executable sequence between the store instruction and the attempt to commit the atomic transaction.

13. The storage medium of claim 9, wherein said reducing is dependent on one or more of: a static analysis of the source representation, or a dynamic analysis of the executable sequence of instructions.

14. The storage medium of claim 9, wherein said preparing is performed in response to a dynamic analysis of the executable sequence of instructions.

15. A system comprising:
two or more processors;
a memory coupled to the two or more processors and storing program instructions executable by two or more processors to implement:
preparing an executable sequence of instructions corresponding to a source representation of code comprising an atomic transaction;

wherein said preparing comprises:
reducing a runtime interval of at least one execution path of the executable sequence between execution of a store instruction of the atomic transaction and an attempt to commit the atomic transaction, wherein the store instruction is an instruction whose execution stores a value into a shared memory location.

16. The system of claim 15, wherein said reducing comprises configuring the executable sequence to:
execute the store instruction only if the memory location does not already contain the value; and
not execute the store instruction if the memory location already contains the value.

17. The system of claim 15, wherein said reducing comprises reducing the number of instructions comprising a dynamic execution path of the executable sequence between the store instruction and the attempt to commit the atomic transaction.

18. The system of claim 15, wherein said reducing comprises reducing a cumulative runtime of instructions comprising a dynamic execution path of the executable sequence between the store instruction and the attempt to commit the atomic transaction.

19. The system of claim 15, wherein said reducing is dependent on one or more of: a static analysis of the source representation, or a dynamic analysis of the executable sequence of instructions.

20. The system of claim 15, wherein said preparing is performed in response to a dynamic analysis of the executable sequence of instructions.

* * * * *